(12) United States Patent
Dannheisig et al.

(10) Patent No.: US 10,434,562 B2
(45) Date of Patent: Oct. 8, 2019

(54) METHOD FOR CONNECTING A FIRST COMPONENT TO A SECOND COMPONENT BY PLASTIC DEFORMATION

(71) Applicant: JOHNSON CONTROLS GMBH, Burscheid (DE)

(72) Inventors: Andreas Dannheisig, Sassenberg (DE); Maximilian Platvoet, Remscheid (DE); Ludger Mühlenbrock, Recklinghausen (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 438 days.

(21) Appl. No.: 15/105,244

(22) PCT Filed: Dec. 16, 2014

(86) PCT No.: PCT/EP2014/078004
§ 371 (c)(1),
(2) Date: Jun. 16, 2016

(87) PCT Pub. No.: WO2015/091514
PCT Pub. Date: Jun. 25, 2015

(65) Prior Publication Data
US 2016/0311008 A1 Oct. 27, 2016

(30) Foreign Application Priority Data

Dec. 17, 2013 (DE) .................. 10 2013 020 831
Mar. 31, 2014 (DE) .................. 10 2014 206 028

(51) Int. Cl.
*B21D 39/06* (2006.01)
*B21D 39/20* (2006.01)
(Continued)

(52) U.S. Cl.
CPC .............. *B21D 39/06* (2013.01); *B21D 37/16* (2013.01); *B21D 39/20* (2013.01); *B21D 39/203* (2013.01);
(Continued)

(58) Field of Classification Search
CPC ...... B21D 39/203; B21D 39/20; B21D 39/06; B21D 37/16; B23P 11/025;
(Continued)

(56) References Cited

U.S. PATENT DOCUMENTS 1,514,099 A * 11/1924 Pring .................... B21D 39/06
29/282
1,578,019 A 3/1926 Ellis et al.
(Continued)

FOREIGN PATENT DOCUMENTS

CN 871 02 477 A 10/1987
CN 15 69 355 A 1/2005
(Continued)

OTHER PUBLICATIONS

Chinese Office Action dated Mar. 27, 2017.

*Primary Examiner* — Jermie E Cozart
(74) *Attorney, Agent, or Firm* — McGlew and Tuttle, P.C.

(57) ABSTRACT

A method is provided for connecting a first component to a second component. The first component has a deformation region, wherein the deformation region is at least partially heated in a first step. An inner die for the plastic deformation is provided in a second method step. The first component is plastically deformed in the deformation region in order to connect the first component to the second component in a third step, and wherein the deformation region is at least partially contacted by the inner die in the second step.

18 Claims, 1 Drawing Sheet

(51) Int. Cl.
*B23P 11/02* (2006.01)
*B21D 37/16* (2006.01)

(52) U.S. Cl.
CPC ......... *B23P 11/025* (2013.01); *Y10T 29/4992* (2015.01); *Y10T 29/49865* (2015.01); *Y10T 29/49911* (2015.01); *Y10T 29/49915* (2015.01)

(58) Field of Classification Search
CPC ........... Y10T 29/4992; Y10T 29/49915; Y10T 29/49911; Y10T 29/49865
See application file for complete search history.

(56) References Cited

U.S. PATENT DOCUMENTS

| | | | |
|---|---|---|---|
| 2,155,416 A * | 4/1939 | Geyer | B21D 39/06 72/392 |
| 3,449,812 A * | 6/1969 | Ebbinghaus | B21D 39/06 29/243.518 |
| 3,474,651 A * | 10/1969 | Hicks | B21D 39/06 72/118 |
| 3,885,298 A * | 5/1975 | Pogonowski | B21D 39/046 285/382.4 |
| 4,309,891 A * | 1/1982 | Pogonowski | B21D 39/04 72/370.08 |
| 4,319,393 A * | 3/1982 | Pogonowski | B21D 39/04 29/434 |
| 4,782,571 A | 11/1988 | Krips et al. | |
| 8,156,630 B2 | 4/2012 | Miyazaki et al. | |

FOREIGN PATENT DOCUMENTS

| | | |
|---|---|---|
| CN | 202 984 481 U | 6/2013 |
| CN | 203 565 693 U | 4/2014 |
| DE | 10 2013 209948 A1 | 12/2014 |
| GB | 22185 A | 8/1907 |
| GB | 1 163 583 A | 9/1969 |
| JP | H08-192 235 A | 7/1996 |
| JP | 2005 224844 A | 8/2005 |

\* cited by examiner

-- Prior Art --

METHOD FOR CONNECTING A FIRST COMPONENT TO A SECOND COMPONENT BY PLASTIC DEFORMATION

CROSS REFERENCE TO RELATED APPLICATIONS

This application is a United States National Phase Application of International Application PCT/EP2014/078004 filed Dec. 16, 2014 and claims the benefit of priority under 35 U.S.C. § 119 of German Patent Applications 10 2013 020 831.9 filed Dec. 17, 2013 and 10 2014 206 028.1 filed Mar. 31, 2014, the entire contents of which are incorporated herein by reference.

FIELD OF THE INVENTION

The present invention relates to a method for connecting two components.

BACKGROUND OF THE INVENTION

In automobile construction, components are nowadays connected to one another ever more frequently by plastic forming, preferably by tensile-compressive forming, such as for example upset bulging, crimping or flanging. Compared with other joining methods, such as welding, connecting by plastic forming has the advantage for example of a lower cycle time in the production process and the avoidance of coating problems caused by the formation of scale. Particularly coating problems sometimes have to be laboriously reworked and are therefore undesired. The thin-walled components that are required for plastic forming, preferably tubes, for their part require auxiliary means or methods that further improve the quality of the connection between the components.

SUMMARY OF THE INVENTION

An object of the present invention is to provide a method or an auxiliary means by which the connecting of a first component to a second component by plastic forming is further improved.

This object of the present invention is achieved by a method for connecting a first component to a second component, wherein the first component has a deformation region, wherein in a first method step the deformation region is at least partially heated, wherein in a second method step an inner die for the plastic deformation is provided, wherein in a third method step the first component is plastically deformed in the deformation region to connect the first component to the second component and wherein in the second method step the deformation region is at least partially contacted by the inner die.

It is advantageously possible here that during the plastic deformation parts of the first component that are not to be included in the forming process are supported on the inner die of the first component. In particular, a pressure is exerted from the inner die onto the first component in the third method step. The plastic deformation preferably comprises a tensile-compressive forming, in particular an upset bulging, a crimping and/or a flanging. In particular, the plastic deformation of the first component creates bulges which interact in an interlocking and/or frictionally engaging manner along at least one direction, preferably along two opposite directions. In particular, the second component is enclosed by the bulges, whereby a connection can be advantageously obtained between the first component and the second component. By supporting on the inner die, higher bulges can be created in comparison with plastic deformation without an inner die, whereby the stability of the connection of the first component to the second component is improved. The contacting of the inner die with the first component in the deformation region, in particular with the parts of the first component that are not to be included in the forming process, allows particularly high bulges to be created. It is also conceivable that a pressure is exerted from the inner die onto the first component in the third method step, whereby the plastic deformation is advantageously controllable. In particular, in this way the bulges can be improved with regard to their symmetry or uniformity.

In a further embodiment of the present invention, it is provided that in the second method step the inner die is moved at least partially along the deformation region. As a result, the plastic deformation can be advantageously further assisted or controlled.

In a further embodiment of the present invention, it is provided that the inner die has a movable portion, the movable portion being contacted at least partially with the deformation region in the second method step. In particular, the pressure from the movable portion to the first component, in particular in the deformation region, is fixed by moving the movable portion out from the inner die. For this purpose it is provided that the inner die is arranged in relation to the first component in such a way that the movable portion at least partially contacts the deformation region.

In a further embodiment of the present invention, it is provided that the first component is formed by a hollow body, preferably a hollow body with an axis of symmetry. In particular, it is a tube, for example a seat cushion tube for a vehicle seat. Furthermore, the hollow body has an inner side, facing the axis of symmetry, and an outer side, facing away from the axis of symmetry. The distance between the inner die and the inner side of the first component along a direction running perpendicularly in relation to the axis of symmetry is referred to as the inner spacing.

In a further embodiment of the present invention, it is provided that in the second method step, the inner die is arranged in the hollow body of the first component, in the third method step, the movable portion of the inner die is pressed against the inner side of the hollow body and/or in the third method step, the inner die is rotated. As a result, the formation of the bulge can be advantageously further controlled. In this case it is provided that a pressure and/or a rotational speed is set to define the height and shape of the bulge caused by the plastic deformation.

Preferably, the pressure and/or the rotational speed is adapted to the nature of the first component, such as for example the thickness or material. By rotation and/or pressure, the dimensioning and shape of the bulge can be advantageously defined. Furthermore, it is provided that a number of bulges are produced in the third method step. It is in this case conceivable that a first subregion and a second subregion are heated in the first method step, the inner die having a movable portion and a further movable portion. In particular, it is provided that the movable portion presses against the first subregion and the further movable portion presses against the second subregion. Preferably, the pressure and/or the rotational speed of the movable portion or of the further movable portion is/are adapted individually to the first subregion or the second subregion. As a result, two bulges can be created in the third method step, the respective shape and/or dimensioning of the individual bulge being defined individually by the pressure or the rotational speed that is respectively set.

In a further embodiment, it is provided that in a fourth method step the inner die is removed from the first component. Preferably, the movable portion is moved back before the fourth method step. As a result, the cross section of the inner die is reduced along a plane extending perpendicularly in relation to the axis of symmetry in comparison with the inner die with the portions extended. As a result, the removal of the inner die from the first component is advantageously facilitated, the inner die preferably being removed from the first component contactlessly (with respect to the first component) in order advantageously to avoid deformation of the bulges by jamming or rubbing (between the first component and the inner die). Preferably, the inner spacing in the fourth method step is always greater than 0.01 mm.

In a further embodiment, it is provided that the deformation region is heated at least partially in the first method step by radiation and/or induction. In particular, the first subregion and/or the second subregion in the deformation region is heated. By radiation and/or induction, the first component can be heated in a specific manner in the desired regions.

A further subject of the present invention is an inner die with movable portions for connecting a first component to a second component by one of the methods described above. By means of such an inner die, the pressure of the inner die on the first component, in particular on the deformation region, can be set or fixed, whereby the plastic deformation, and consequently the dimensioning and shaping, of the bulges caused by the plastic deformation can be advantageously manipulated.

In a further embodiment of the present invention, it is provided that the inner die has an axis of symmetry, the inner die with a retracted portion having a first cross section in a plane running perpendicularly in relation to the axis of symmetry and the inner die with an extended portion having a second cross section in a plane running perpendicularly in relation to the axis of symmetry, the second cross section being greater than the first cross section. In this case it is provided that the inner die has portions that are extended during the plastic deformation and portions that are retracted during the extraction of the inner die from the first component.

In a further embodiment of the present invention, it is provided that the inner die with the retracted portion can be guided contactlessly into a cavity region of the first component or out of the cavity region of the first component. As a result, the inner die can be advantageously removed after the plastic deformation, the probability of contact of the inner die with the first component during the extraction from the first component being reduced with increasing inner spacing.

Further details, features and advantages of the invention emerge from the drawings and from the subsequent description of preferred embodiments on the basis of the drawings. The drawings thereby merely illustrate embodiments of the invention that are given by way of example and do not restrict the essential concept of the invention. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
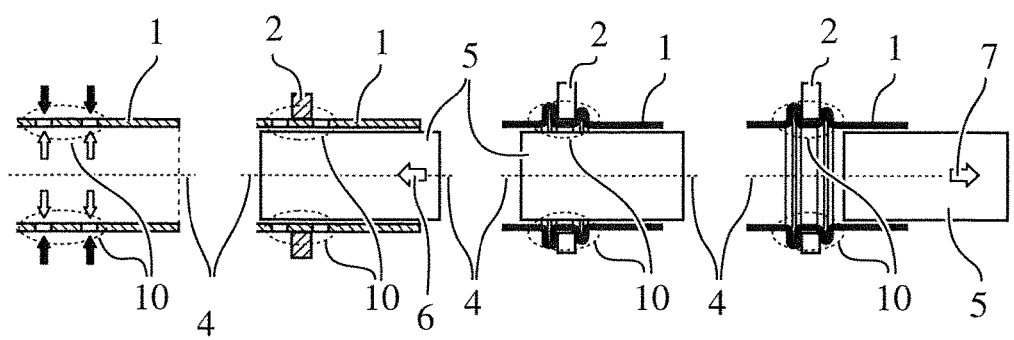
FIG. 1 is a sectional view showing a method for connecting a first component to a second component by plastic deformation according to the prior art.

Referring to the drawings, in the various figures, the same parts are always provided with the same designations and are therefore generally also only referred to or mentioned once in each case.

In FIG. 1, a method for connecting a first component 1 to a second component 2 by plastic deformation according to the prior art is represented, snapshots in the course of the method presented being illustrated from left to right. The plastic forming that is required for the connection is typically a tensile-compressive forming; in particular, it is a joining by upset bulging. It is in this case typically provided that the first component 1 is provided as a hollow body, preferably as a tube, with an axis of symmetry 4. It is also provided that the first component 1 has a deformation region 10, the deformation region 10 being made to bulge by the plastic forming in such a way that a bulge that is produced (by the plastic forming) interacts in an interlocking and/or frictionally engaging manner with the second component 2 and the first component 1 is held together with or connected to the second component 2 by this interaction. Preferably, the first component 1 is heated in the deformation region 10 before the plastic deformation in a first method step. By the heating, the material properties of the first component 1 are modified to the extent that the plastic deforming can take place with preference in the heated regions rather than the non-heated regions. Furthermore, the probability of crack formation during the deforming is reduced by the heating. In particular, it is provided that, in a second method step, an inner die 5 is arranged within the cavity, in particular within the deformation region. In particular, the inner die 5 is inserted along a direction of insertion 6. Moreover, the second component 2 is arranged in the deformation region 10 on the first component 1. Preferably, the first component 1 has a clearance, the second component 2 being able to be arranged within the clearance, preferably with an exact fit. In particular, the second component 2 is arranged directly adjoining the first component 1, preferably in contact, along the entire circumference. Furthermore, it is conceivable that a first subregion and a second subregion in the deformation region 10 are heated in the first method step, the second component 2 adjoining the third subregion, which is arranged between the first and second subregions along a direction running parallel to the axis of symmetry 4. The third illustration from the left shows the plastic deforming of the first component 1. Here it is provided that bulges are created in the first and second subregions of the deformation region by the plastic deformation, the second component 2 being arranged in an interlocking manner in relation to the bulges along a direction running parallel to the axis of symmetry 4. In particular, the second component 2 is enclosed by the bulges, whereby the connection of the first component 1 and the second component 2 can be achieved. Preferably, the inner die 5 is advantageously supported on the parts that are not to be included in the forming process. In particular, it has surprisingly been found that the quality of the plastic deformation, in particular the upset bulging, can be improved with an increasingly smaller inner spacing between the inner die 5 and the inner side of the first component 1 along a direction running perpendicularly in relation to the axis of symmetry 4. It is therefore desirable to choose an inner spacing that is as small as possible. The inner spacing cannot however be reduced at will, since in a fourth method step (fourth image from the left) the inner die 5 has to be withdrawn again from the cavity along a direction of extraction 7. Here there is the risk of the inner die 5 and the first component 1 jamming or rubbing against one another if the inner spacing is chosen to be too small. If the inner spacing is chosen to be too small, the finished first component 1 has unsymmetrical or unevenly formed bulges, which reduce the quality of the connection of the first component 1 and the second component 2. According to the prior art, a compromise between a smallest possible inner spacing and an inner spacing that allows largely contactless extraction of the inner die 5 from the cavity of the first component 1 has to be found in the method of producing the connection.

Figure 2:
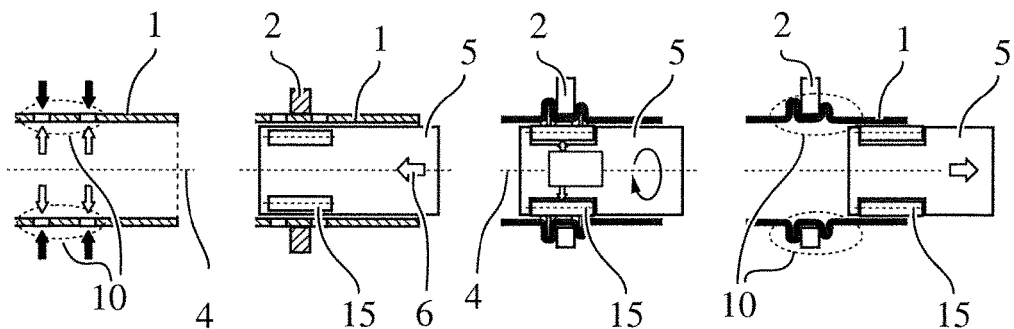
FIG. 2 is a sectional view showing a method for connecting a first component to a second component by plastic forming according to a first embodiment of the present invention that is given by way of example.

In FIG. 2, a method for connecting a first component 1 to a second component 2 by plastic deformation according to a first exemplary embodiment of the present invention is represented, snapshots in the course of the method presented being schematically illustrated from left to right. The method differs from the method presented in FIG. 1 by the inner die 5, which has a movable portion 15. In particular, it is provided that the inner die 5 is arranged in the cavity of the first component 1 in the second method step in such a way that the movable portion 15 is arranged adjacent the deformation region 10 along a direction running perpendicularly in relation to the axis of symmetry 4. Furthermore, it is provided that the movable portion 15 is moved out or spread for the third method step. In particular, the movable portion 15 is moved out in such a way that during the second method step the movable portion 15 lies at least partially against the inner side of the deformation region 10 of the first component 1, preferably against the parts of the deformation region 10 that are not to be included in the forming process. In particular, a pressure acts from the movable portion 15 onto the first subregion. Furthermore, it is provided that in the second method step the inner die 5 is rotated about the axis of symmetry 4. As a result, the plastic deformation can be advantageously additionally controlled or influenced. Furthermore, it is provided that the movable portion is retracted again for the fourth method step. In particular, the movable portion 15 is retracted into the inner die 5 in such a way that—for all positions along the axis of symmetry 4—the inner spacing does not go below a minimum spacing. Preferably, the minimum spacing is 0.1 mm. In the retracted state, the movable portions 15 can be removed together with the inner die 5 substantially contactlessly from the cavity of the first component 1. As a result, bulges or plastic deformations that are more uniform and more symmetrical in comparison with the prior art can be obtained. In particular, higher walls can be obtained in comparison with the prior art, whereby the load-bearing proportion, and consequently the strength, of the connection between the first and second components 1 and 2 is advantageously increased.

While specific embodiments of the invention have been shown and described in detail to illustrate the application of the principles of the invention, it will be understood that the invention may be embodied otherwise without departing from such principles.

The invention claimed is:

1. A method for connecting a first component to a second component, the method comprising the steps of:
providing the first component with a deformation region;
at least partially heating the deformation region;
providing an inner die for the plastic deformation; and
plastically deforming the first component in the deformation region to connect the first component to the second component and wherein the deformation region is at least partially contacted by the inner die, wherein plastically deforming the first component comprises an upset bulging, wherein the inner die has a movable portion, the movable portion being contacted at least partially with the deformation region, wherein in the step of plastically deforming the first component, the movable portion is moved out or spread, the inner die being arranged in a hollow body of the first component, the inner die being rotated during said step of plastically deforming the first component.

2. The method as claimed in claim 1, wherein the inner die has a movable portion, the movable portion being contacted at least partially with the deformation region.

3. The method as claimed in claim 1, wherein:
the movable portion of the inner die is pressed against the inner side of the hollow body during said step of plastically deforming the first component.

4. The method as claimed in claim 1, wherein the inner die is removed from the first component subsequent to said step of plastically deforming the first component.

5. The method as claimed in claim 1, wherein the deformation region is heated at least partially by radiation or induction or by both radiation and induction.

6. The method as claimed in claim 1, wherein the inner die is moved at least partially along the deformation region.

7. An inner die with movable portions for connecting a first component to a second component by plastically deforming the first component in a heated deformation region of the first component to connect the first component to the second component and wherein the inner die includes at least one movable portion to at least partially contact the deformation region, wherein plastically deforming the first component comprises an upset bulging, the movable portion being moved out or spread during plastically deforming the first component and the inner die being rotated during plastically deforming the first component.

8. The inner die as claimed in claim 7, wherein the inner die has an axis of symmetry, the inner die having a first cross section in a plane running perpendicularly in relation to the axis of symmetry when the movable portion is in a retracted position and the inner die having a second cross section in a plane running perpendicularly in relation to the axis of symmetry when the movable portion is in an extended position, the second cross section being greater than the first cross section.

9. The inner die as claimed in claim 8, wherein the inner die with the retracted portion can be guided contactlessly into a cavity region of the first component or out of the cavity region of the first component.

10. The inner die as claimed in claim 8, wherein the inner die is moved at least partially along the deformation region.

11. The inner die as claimed in claim 8, wherein the movable portion at least partially contacts the deformation region.

12. The inner die as claimed in claim 8, wherein the first component is formed by a hollow body.

13. The inner die as claimed in claim 12, wherein the inner die is arranged in the hollow body of the first component and the movable portion of the inner die is pressed against the inner side of the hollow body during plastically deforming the first component.

14. The inner die as claimed in claim 13, wherein the inner die is removeable from the first component subsequent to plastically deforming the first component.

15. The inner die as claimed in claim 8, wherein the heated deformation region is heated at least partially by radiation or induction or by both radiation and induction.

16. The inner die as claimed in claim 7, wherein the upset bulging comprises a first bulge and a second bulge defined by the first component, the second component being located between the first bulge and the second bulge.

17. A method for connecting a first component to a second component, the method comprising the steps of:

providing the first component with a deformation region;

at least partially heating the deformation region;

providing an inner die for the plastic deformation; and plastically deforming the first component in the deformation region to connect the first component to the second component, wherein the deformation region is at least partially contacted by the inner die, the inner die having a movable portion, the inner die being arranged in an interior space of the first component during the step of plastically deforming the first component, the movable portion contacting at least a portion of the deformation region during the step of plastically deforming the first component, wherein the inner die is rotated during the step of plastically deforming the first component.

18. The method as claimed in claim 17, wherein plastically deforming the first component forms a first projection and a second projection extending from the first component, the second component being in contact with the first projection and the second projection.

* * * * *